F. WARREN.
WEEDLESS ARTIFICIAL BAIT.
APPLICATION FILED DEC. 21, 1914.

1,209,237.

Patented Dec. 19, 1916.

WITNESSES:
O. Johnson
A. Haskins

INVENTOR
Frank Warren
BY
C. D. Haskins
ATTORNEY

UNITED STATES PATENT OFFICE.

FRANK WARREN, OF SEATTLE, WASHINGTON.

WEEDLESS ARTIFICAL BAIT.

1,209,237.  Specification of Letters Patent.  Patented Dec. 19, 1916.

Application filed December 21, 1914. Serial No. 878,296.

*To all whom it may concern:*

Be it known that I, FRANK WARREN, a citizen of the United States, residing at Seattle, in the county of King and State of Washington, have invented a certain new and useful Improvement in Weedless Artificial Baits, of which the following is a specification.

My invention relates to improvements in artificial bait of that class which is employed in catching fish, and the object of my invention is to provide an artificial bait within which is embodied fish-hooks and mechanism associated therewith which normally are so disposed in recesses therein that when such bait is attached to a fish line it may be cast in a body of water among weeds and brush and drawn therethrough without any liability of its hooks engaging with or being caught on such weeds and brush or on other obstructions within the water, but if such bait then be seized by a fish to cause additional strain on its fish line then such mechanism shall be actuated to project its associated fish-hooks outwardly from their recesses to catch such fish. I attain this object by devices illustrated and described in the accompanying drawings in which—

Figure 1:
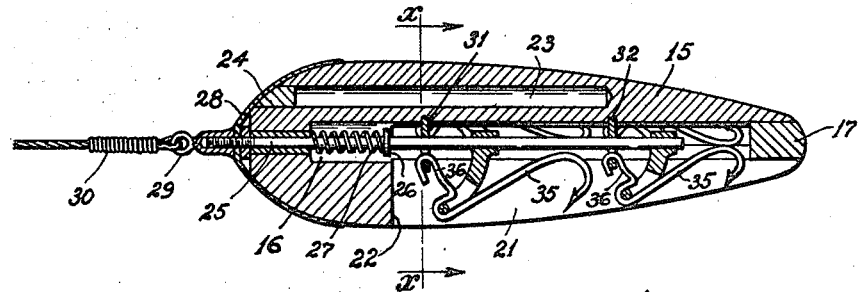
Figure 2:
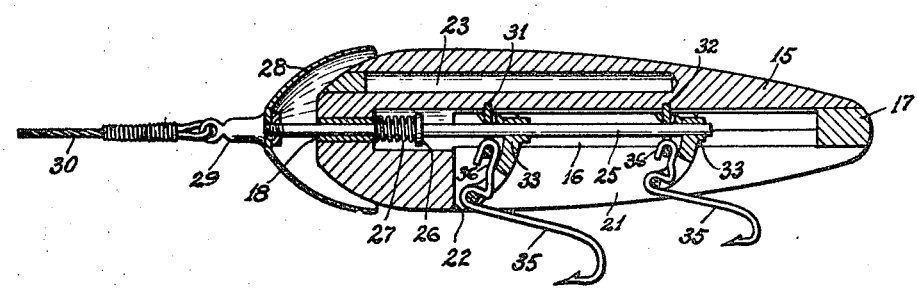
Figure 3:
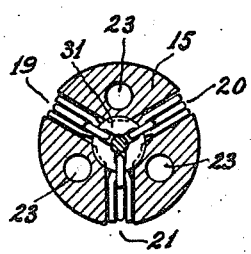
Figure 4:
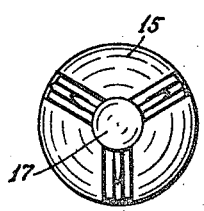
Figure 5:
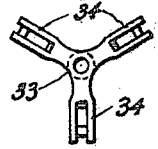
Figure 6:
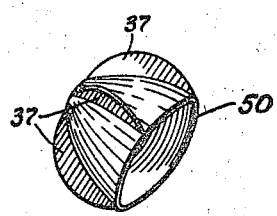

Figure 1 illustrates an artificial bait embodying one form of my invention by a view in longitudinal mid-section with its parts in their normal position; Fig. 2 is a like view of the same showing some of its operative parts in positions which they would assume if the structure be seized by a fish; Fig. 3 is a view of the same in cross-section on broken line *x, x* of Fig. 1; Fig. 4 is a rear view of the same; Fig. 5 is a plan view of a detail of the same; and Fig. 6 is a perspective view of another detail of the same.

Referring to the drawings, throughout which like reference numerals indicate like parts, in Figs. 1 and 2, 15 indicates a cigar-shaped body portion of an artificial bait, preferably made of soft, light wood and coated with paint to have a shiny white surface with some red marks thereon to adapt it to attract attention of fish. Extending longitudinally through said body portion 15 is a concentrically disposed hole 16 which is plugged with a wooden plug 17 at the rear end of the body portion 15 and which is provided with a metal bushing 18 at the forward end of said body portion 15 and extending between said hole and the periphery of the body portion 15 in radial planes that are equi-distant one from the others are three slots 19, 20 and 21 which extend lengthwise of the body 15 from the inner end of the plug 17 to a point indicated by the numeral 22 near the forward end portion of said body portion 15 as shown in Figs. 1 and 2.

In order to add buoyancy to the structure there are provided three longitudinal holes 23 disposed at equi-distant points one from another each between adjacent ones of the slots 19, 20 and 21, as more clearly shown in Fig. 3, the entrance of each of which holes 23 is closed by a wooden plug 24 adjacent to the forward end of the body portion 15, as more clearly shown in Figs. 1 and 2, whereby such holes 23 form hollow airtight chambers. Under some conditions of use, however, when the body portion 15 is made of very light wood such hollow air chambers may not be necessary.

Extending through the metal bushing 18 into the hole 16 is a shaft 25 and upon such shaft 25 within the hole 16 is fixed a collar 26, between which collar 26 and the bushing 18 is a helical compression spring 27 whose force tends to move the shaft 25 inwardly to rest in a position wherein a bell-shaped cap 28 (formed of thin sheet metal, and which is fixed on the outer end of the shaft 25) will engage with and cover the forward end portion of the body portion 15. To the apex of the bell-shaped cap 28 is attached an eye-ring 29 to which may be connected a fish line 30 in an obvious manner, as more clearly shown in Figs. 1 and 2.

Within the hole 16, at such suitable distance one from the other as will afford a space of the length of a fish-hook, are disposed two disks 31 and 32 of a diameter slightly larger than the diameter of the hole 16 whereby their edges may project into notches formed in the inner surface of said hole 16 to support them in a fixed position as more clearly shown in Figs. 1 and 2, and such disks 31 and 32 are provided each with a centrally disposed hole through which the shaft 25 extends to be guided thereby. Said disks 31 and 32 may be placed in their respective positions by introducing them into the hole 16 and moving them to their respective notches before the plug 17 is placed in its position, the three segmental portions of the body 15 being sufficiently elastic to be forced to spring outwardly sufficiently to admit the disks 31 and 32 which are only slightly larger in diameter than the normal diameter of the hole 16.

Fixed on the shaft 25 adjacent to each of the disks 31 and 32, as shown in Figs. 1 and 2 is a hub 33 from which extend in radial planes three arms 34 which project within respective ones of the slots 19, 20 and 21 of the body portion 15 and to the end of each of the arms 34 of each of the hubs 33 is articulated a fish-hook 35 and from the pivoted portion of each of said fish-hooks 35 extends an integral curved portion 36 which is articulated with the adjacent one of the disks 31 and 32 whereby when the arms 34 move in a lengthwise direction in the slots 19, 20 and 21, in response to a longitudinal movement of the shaft 25, then the hooks 35 will be actuated to project outwardly from the slots 19, 20 and 21 or be drawn therewithin, according to the direction of such longitudinal movement. Thus, when the structure is drawn through the water in the operation of fishing the friction of the water on its tapering circumferential surface will be the only force which normally will tend to compress the helical spring 27 and such force will be insufficient to overcome the force of such spring 27 and therefore the hooks 35 will be maintained in their positions as indicated in Fig. 1, in which position they may not come in contact with weeds or brush and the cap 28 will cover the front end of the structure in contact therewith to receive the pressure of the water due to the movement of the structure through such water, but if a fish seizes the structure then the strain on the line 30 will act on the shaft 25 to compress the helical spring 27 whereupon the coaction of the arms 34 and the hooks 35 will project such hooks 35 outwardly from the slots 19, 20 and 21 to hook into the fish's jaws in an obvious manner while the cap 28 will then be disposed in the position shown in Fig. 2.

In Fig. 6 I have shown a modified form of cap 50 which may be substituted for the cap 28 and such cap 50 is provided with fins 37 which may serve to cause the structure to wabble in a greater degree as it is drawn through the water thereby to be more attractive to fish.

Manifestly, if it be desired, for some condition of use, only one slot, like the slots 19, 20 and 21, need be provided in a body portion, like the body portion 15 and within such slot may be disposed a single fish-hook operatively associated with mechanism actuated in response to the relative movement of a centrally disposed shaft, like the shaft 25, whereby such single hook may be effective in the operation of catching fish, or such body portion may be provided with more than three slots like slots 19, 20 and 21 together with an increased number of fish-hooks; and other changes may be made with respect to the form, dimensions and arrangement of parts of my invention without departing from the spirit thereof.

What I claim is:

1. An artificial bait embodying a body portion, a shaft, a plurality of arms fixed in a longitudinal position on said shaft and disposed to project radially therefrom, a fish-hook pivotally attached to the outer end of each of said arms and adapted to swing in a radial plane away from and toward said shaft, an inwardly projecting member extending from the pivoted end portion of each of said fish-hooks, a collar surrounding said shaft through which said shaft may slidably move, said collar being disposed to engage with each of said inwardly projecting members of said fish-hooks, and elastic means operatively associated with said shaft and with said body portion whereby said collar may be caused normally to maintain said hooks in their inwardmost positions.

2. An artificial bait embodying a body portion, a shaft, an arm fixed in a longitudinal position on said shaft and disposed to project therefrom, a fish hook pivotally attached to the outer end of said arm and adapted to swing away from and toward said shaft, an inwardly projecting member extending from the pivoted end portion of said fish-hook, a collar surrounding said shaft through which said shaft may slidably move, said collar being disposed to engage with said inwardly projecting member of said fish-hook, and elastic means operatively associated with said shaft and with said body portion whereby said collar may be caused normally to maintain said hook in its innermost position.

In witness whereof, I hereunto subscribe my name this fifteenth day of December A. D., 1914.

FRANK WARREN.

Witnesses:
O. JOHNSON,
A. HASKINS.